(12) United States Patent
McCandless et al.

(10) Patent No.: US 9,984,368 B2
(45) Date of Patent: May 29, 2018

(54) SYSTEM AND METHOD FOR MANAGING A COMPROMISED ACCOUNT

(71) Applicant: MasterCard International Incorporated, Purchase, NY (US)

(72) Inventors: Edward Kenneth McCandless, Wentzville, MO (US); Frederick Joseph Zarf, IV, Lake St. Louis, MO (US); Steven J. Schmidt, Wentzville, MO (US)

(73) Assignee: MasterCard International Incorporated, Purchase, NY (US)

( * ) Notice: Subject to any disclaimer, the term of this patent is extended or adjusted under 35 U.S.C. 154(b) by 323 days.

(21) Appl. No.: 14/792,060

(22) Filed: Jul. 6, 2015

(65) Prior Publication Data

US 2017/0011389 A1 Jan. 12, 2017

(51) Int. Cl.
G06Q 20/32 (2012.01)
G06Q 20/36 (2012.01)
G06Q 20/40 (2012.01)

(52) U.S. Cl.
CPC ........... *G06Q 20/36* (2013.01); *G06Q 20/32* (2013.01); *G06Q 20/4016* (2013.01)

(58) Field of Classification Search
None
See application file for complete search history.

(56) References Cited

U.S. PATENT DOCUMENTS

| 8,095,464 B2* | 1/2012 | Patterson ............... G06Q 20/02 705/35 |
| 8,180,704 B2* | 5/2012 | McQuaide, Jr. ........ G06Q 10/10 705/39 |
| 2007/0226086 A1 | 9/2007 | Bauman et al. |

(Continued)

FOREIGN PATENT DOCUMENTS

| JP | 10188132 A | 7/1998 |
| JP | 200232694 A | 1/2002 |

(Continued)

OTHER PUBLICATIONS

PCT International Search Report and Written Opinion for related matter PCT/US2016/038004 dated Sep. 27, 2016; 9 pages.

*Primary Examiner* — Allen C Chein
(74) *Attorney, Agent, or Firm* — Armstrong Teasdale LLP

(57) ABSTRACT

A method of managing a compromised account stored within an electronic wallet is provided. The electronic wallet is stored on a user computing device and is in communication with a compromised account management (CAM) computing device. The method is implemented using the CAM computing device in connection with a memory. The method includes the step of receiving, from the user computing device via a compromised reporting function, a first notification message including a first account identifier, wherein the first notification message indicates that a first account associated with the first account identifier has been compromised. The method also includes determining an issuer associated with the first account identifier. The method (Continued)

further includes generating a second notification message including the first account identifier and an issuer identifier. The method also includes transmitting the second notification message to the issuer.

18 Claims, 9 Drawing Sheets

(56) References Cited

U.S. PATENT DOCUMENTS

| | | | |
|---|---|---|---|
| 2008/0103778 A1* | 5/2008 | Kim | H04M 3/493 |
| | | | 704/270.1 |
| 2009/0228384 A1 | 9/2009 | Melik-Aslanian et al. | |
| 2014/0244461 A1 | 8/2014 | Shenoy et al. | |
| 2015/0032624 A1* | 1/2015 | Claridge | G06Q 20/4016 |
| | | | 705/44 |
| 2016/0182543 A1* | 6/2016 | Aabye | H04L 63/1416 |
| | | | 726/5 |
| 2016/0321669 A1* | 11/2016 | Beck | G06O 20/4016 |
| 2017/0316402 A1* | 11/2017 | Anantharaman | G06Q 20/342 |

FOREIGN PATENT DOCUMENTS

| | | | |
|---|---|---|---|
| JP | 2004287594 A | 10/2004 | |
| JP | 200852513 A | 3/2008 | |
| JP | 2013140489 A | 7/2013 | |

* cited by examiner

SYSTEM AND METHOD FOR MANAGING A COMPROMISED ACCOUNT

BACKGROUND OF THE DISCLOSURE

The field of the present disclosure relates to managing a compromised account and, more particularly, to computer-based methods and systems for managing a compromised account included within a digital wallet having an account management functionality.

Accountholders frequently hold their plastic payment cards in wallets or purses. Often, the wallet or purse is not in close proximity with the accountholder (e.g., it may be in a desk drawer, in laptop bag, or in a vehicle). As a result, the payment account is prone to being compromised because of loss, theft, or damage to the card. Additionally, payment accounts used in transactions where the card is not always presented (e.g., recurring card-on-file transactions such as for a health club membership) may be more prone to fraud as individuals who may have access to the payment card information, in some cases, fraudulently initiate transactions without the accountholder's authorization. In the event that the payment account is compromised, the accountholder typically cannot easily obtain a new payment card and/or continue to make purchases using the associated payment card account. Accountholders must resort to contacting the issuer of each individual card they lost, especially in the event that a whole wallet containing multiple payment cards is compromised. This is cumbersome and may be difficult since, without the card itself, accountholders may not recall each issuer's name and contact information from memory.

Increasingly, accountholders perform transactions using their computing devices instead of their physical payment cards. For example, mobile computing devices such as smartphones now support electronic wallet application software that enables accountholders to store multiple payment card accounts in their smartphones and use their phones to perform the transaction without having to swipe the plastic card. As a result, the plastic card either remains in the accountholder's wallet or is stored at home or elsewhere, increasing the chances of compromise.

BRIEF DESCRIPTION OF THE DISCLOSURE

In one aspect, a method for method of managing a compromised account stored within an electronic wallet application on a user computing device is provided. The electronic wallet is in communication with a compromised account management (CAM) computing device. The method is implemented using the CAM computing device, which is in connection with a memory. The method includes the step of receiving, by the CAM computing device, a first notification message including a first account identifier, the first notification message generated by the user computing device via a compromised reporting function, wherein the first notification message indicates that a first account associated with the first account identifier has been compromised, determining at least one issuer associated with the first account identifier, generating, by the CAM computing device, a second notification message including the first account identifier and an issuer identifier, and transmitting the second notification message, by the CAM computing device, to the at least one issuer.

In another aspect, a system for managing compromise of a payment account that is associated with an electronic wallet is provided. The electronic wallet is stored on a user computing device. The system comprises a database configured to store data associated with the payment account, and a compromised account management (CAM) computing device in communication with the compromise database. The CAM computing device is configured to receive a first notification message including a first account identifier, the first notification message generated by the user computing device via a compromised reporting function, wherein the first notification message indicates that a first account associated with the first account identifier has been compromised, determine at least one issuer associated with the first account identifier, generate a second notification message including the first account identifier and an issuer identifier, and transmit the second notification message to the at least one issuer.

In yet another aspect, a non-transitory computer readable medium that includes computer executable instructions for managing a compromised account that is associated with an electronic wallet is provided. The electronic wallet is stored on a user computing device. When executed by a compromised account management (CAM) computing device in communication with a database, the computer executable instructions cause the CAM computing device to receive a first notification message including a first account identifier, the first notification message generated by the user computing device via a compromised reporting function, wherein the first notification message indicates that a first account associated with the first account identifier has been compromised, determine at least one issuer associated with the first account identifier, generate a second notification message including the first account identifier and an issuer identifier, and transmit the second notification message to the at least one issuer.

BRIEF DESCRIPTION OF THE DRAWINGS

FIG. 1 is a schematic diagram illustrating an example multi-party transaction card industry system for authorizing payment card transactions.

FIG. 2 is a simplified block diagram of an example compromised card account management environment.

FIG. 3 illustrates an example configuration of a user system operated by an accountholder, such as a consumer who uses a payment card issued by an issuing bank and associated with a payment transaction account, shown in FIG. 1.

FIG. 4 illustrates an example configuration of a server system used for compromised account management.

FIG. 5 shows a compromised account management (CAM) computer device in communication with other devices to manage payment card compromise events.

FIG. 6 shows the operation of a CAM computing device during a single payment card compromise incident in greater detail.

FIG. 7 illustrates a series of display states for an exemplary e-wallet application as it communicates with the CAM computing device.

FIG. 8 shows an example method by which the CAM computing device manages compromised accounts.

FIG. 9 shows an example configuration of a database within a computing device, along with other related computing components, that may be used to manage incidents of payment transaction card compromise.

Like numbers in the Figures indicate the same or functionally similar components.

DETAILED DESCRIPTION OF THE DISCLOSURE

Figure 1:
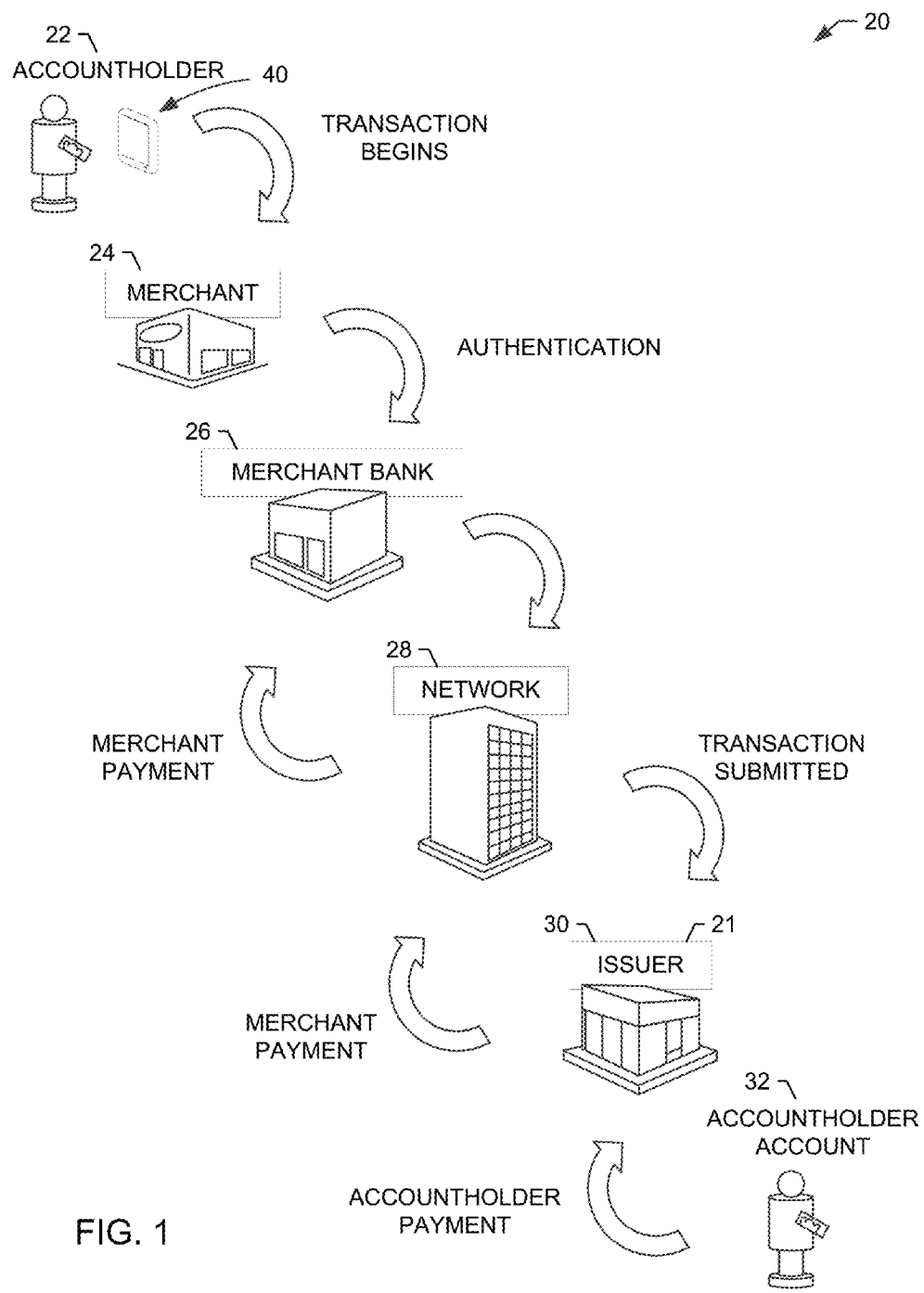
FIGS. 1-9 show example embodiments of the methods and systems described herein.

The systems and methods described herein relate to managing a compromised payment card account. More specifically, the systems and methods described herein relate to managing a compromised payment card account using an "account management functionality" or "reporting functionality" that may be part of or accessible by an electronic wallet application. In the example embodiment, an accountholder will use a user computing device having an electronic wallet application stored thereon that includes the reporting functionality to help manage his or her card usage. In the example embodiment, the reporting functionality is configured to communicate with a compromised account management (CAM) computing device including notifying the CAM computing device that an account has been compromised. The reporting functionality may be part of a larger suite of payment account management functions that is included within an electronic wallet application, or may be a standalone software application running on a user computing device. The reporting functionality may also operate in association with the electronic wallet application as an electronic wallet reporting system.

In the exemplary embodiment, to use the electronic wallet application, an accountholder first registers the payment card account with the electronic wallet application on the user computing device hosting the electronic wallet application. Registering the payment card account with the electronic wallet application may include a payment processor first generating a "token" corresponding to the payment card account. In at least some implementations, the token is a computer-generated alphanumeric string of predetermined length, or it may be a hash value, a key number, a purely numeric or purely alphabetic string, a code sequence, a binary or hexadecimal character sequence, or the like. The payment processor transmits the token to the user computing device for storage. The user computing device stores the token and the association between the token and the payment card account. In one embodiment, the user computing device stores the token in its local memory as well as the primary account number (PAN) associated with the payment card account. In another embodiment, the user computing device stores only the token and the PAN is stored within payment processor computers in addition to the token.

The electronic wallet application is configured to transmit and receive signals from compatible point-of-sale (POS) devices in order to perform payment card transactions. A payment card transaction may involve a user selecting a card or account from the electronic wallet application on the user computing device, with the user computing device in close enough proximity with the POS device (e.g., one enabled with near-field-communication (NFC) technology) in order to exchange signals bearing payment transaction data, including the token. During a transaction, the user computing device transmits the token in lieu of the primary account number (PAN) to a POS device and then on to the payment processor. The payment processor uses the token to look up the PAN and transmits that to the financial institution, to continue the transaction.

The system described herein includes a compromised account management (CAM) computing device that is in communication with a payment processor and the user device having the reporting functionality. The payment processor may be or may be part of a payment processing network configured to process payment card transactions initiated by accountholders of payment cards. The reporting functionality and the CAM computing device enables an accountholder to immediately notify a payment card issuer that one or more payment cards have been compromised. For example, the reporting functionality includes computer-executable instructions that, when executed by a computing device (e.g., a smartphone, tablet, etc.) will communicate with the CAM computing device in a client-server relationship to enable the accountholder and the issuer bank to manage the aftermath of a lost or stolen physical payment card.

In the example embodiment, the reporting functionality may include a button (e.g., a virtual button or icon) labeled, e.g., "Lost My Plastic." In at least some implementations, the reporting functionality may be downloaded from the CAM computing device (e.g., in the form of executable code or other computer-readable instructions). In the example implementation, the accountholder taps the button labeled "Lost My Plastic" on the accountholder's user computing device, (e.g., a smartphone, laptop, or other remote computing device). Data for multiple cards may be stored in the electronic wallet application. In at least some implementations, the reporting functionality may include a separate button for each card, or a single button configurable for use with all cards for which data is stored in the electronic wallet application. Tapping the button on the user computing device causes the CAM computing device to receive an accountholder notification message that the accountholder's payment card or payment account has been compromised.

In one embodiment, the accountholder notification message communicates only that the account has been compromised (e.g., using a flag, cookie, or other electronic means). In another embodiment, the "Lost My Plastic" button may be accompanied by other input fields where the accountholder can clarify the nature of the compromise (e.g., whether the cause was loss, theft, or damage, etc.). The notification message may also contain several data points including the token—stored on the user computing device—that was keyed to or associated with the compromised payment account. The notification message may also include an identifier for the user computing device used to authenticate the device, and incident data relating to the compromise, such as time, date, and location of compromise.

In at least some implementations, the CAM computing device uses the token to look up the associated primary account number (PAN) for the compromised account. Knowing the PAN, the CAM computing device determines the affected accountholder, and the issuer of the account. The CAM computing device creates a second notification message for notifying the issuer. This "issuer notification" (or second notification message) may include the PAN, a message stating that the associated account has been compromised, and a request for further instructions from the issuer. The further action request may be a simple request for instructions for the accountholder, or it may also include a recommendation based on the nature and circumstances of the compromise. The CAM computing device transmits the issuer notification to the issuer computing device.

Where the accountholder notification message included other inputs stating that the cause was theft, the CAM computing device recommendation to the issuer may be to cancel the account immediately. Conversely, where fraud is indicated, the recommendation may be to cancel the account and take additional steps to combat the fraud (e.g., de-authorizing a fraudulent merchant). The CAM computing device is configured to store data relating to past compromise events and uses this data to generate pattern of compromises to identify and reduce future events. For example, the CAM computing device may detect a high incidence of payment card loss at a particular location, such as an automated teller machine (ATM) that fails to return the payment card to the accountholder. The CAM computing device may communicate this information to the relevant issuer for the issuer to take remediation steps.

In at least some implementations, the CAM computing device receives an "issuer response" from the issuer containing an "accountholder instruction." The accountholder instruction may be, for example, to immediately discontinue using the payment card account within the electronic wallet application and to await the receipt of a new physical card. In another embodiment, the issuer response may also include instructions for the payment network (e.g., to generate and transmit a new token to the user computing device). The CAM computing device is configured to transmit the accountholder instruction to the user computing device for display to the accountholder. In other implementations the CAM computing device may also generate a new token, transmit the new token to the user computing device, and display additional instructions on the user computing device notifying the accountholder that a new token has been generated.

In another embodiment, the issuer response also includes a card-on-file (CoF) merchant list. The CoF merchant list includes merchants where the payment card was used in CoF transactions. CoF transactions generally include transactions in which the accountholder does not present a physical payment card, instead the merchant charges an account based on account information stored "on file," for example, in the merchant's records. In at least some implementations, the CAM computing device transmits this list to the user computing device for the accountholder to apprise the CoF merchants of the compromise, or notifies the CoF merchants of the compromise directly.

The technical problems addressed by this system include at least one of: (i) inability of payment processing systems to quickly determine that a card has been compromised and the nature of the compromise, (ii) inability of payment processing systems to identify patterns of compromise, e.g., where and when cards are compromised most commonly, and (iii) inability of accountholders to quickly notify issuers and CoF merchants of compromised payment cards, especially in multiple card, "whole-wallet" compromise scenarios. This is especially a problem in situations where the back-of-card reference information is not readily available and the accountholder does not have immediate access to issuer contact information, e.g., if the accountholder is away from home.

The methods and systems described herein may be implemented using computer programming or engineering techniques including computer software, firmware, hardware, or any combination or subset thereof, wherein the technical effects may be achieved by performing at least one of the following steps: (a) receiving, by the CAM computing device, a first notification message including a first account identifier, the first notification message generated by the user computing device via a reporting functionality, wherein the first notification message indicates that a first account associated with the first account identifier has been compromised, (b) processing the first notification message by the CAM computing device, (c) determining at least one issuer associated with the first account identifier, (d) generating, by the CAM computing device, a second notification message including the first account identifier and an issuer identifier, and (e) transmitting the second notification message, by the CAM computing device, to the at least one issuer.

The resulting technical benefits or technical effects achieved by this system include at least one of: (i) enabling issuers to quickly determine the incidence and causes of card compromise, allowing them to retire legacy systems that are reliant on telephone networks and require mobile software systems to be in compliance with legacy systems, and (ii) provide a single interface for accountholders to manage payment card compromise.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable storage medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile computing devices, or desktop, laptop computing devices, and the like. Each type of transaction card can be used as a method of payment for performing a transaction. As used herein, the term "payment account" is used generally to refer to the underlying account with the transaction card. As used herein, "account management functions," "account management functionality," or "reporting functionality" may refer to any software-implemented process that enables an accountholder to manage payment card usage, such as checking balance, updating funds, updating personal information, and the like.

As used herein, the term "compromise" refers to any incident that precludes use of a payment account, including where a plastic payment card is lost, misplaced, stolen, damaged beyond usability. Compromise can refer to incidents where the payment card itself is affected, where the payment card account is affected, or both. Compromise also includes the incidence of fraud, where an accountholder knows or suspects that someone has gained access to the card information and intends to use it to perform fraudulent or unauthorized transactions.

The following detailed description illustrates embodiments of the disclosure by way of example and not by way of limitation. It is contemplated that the disclosure has general application to financial transactions in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party transaction card industry system 20 for authorizing payment card transactions. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to the consumer or accountholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." Accountholder 22 tenders payment for a purchase using a transaction card, then merchant 24 requests authorization from a merchant bank 26 for the amount of the purchase. Alternatively, accountholder 22 may use user computing device 40 to tender payment for the transaction. The request may be performed over the telephone, but is usually performed through the use of a point-of-sale terminal, which reads accountholder 22's account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether accountholder 22's account 32 is in good standing and whether the purchase is covered by accountholder 22's available credit line. Based on these determinations, the request for authorization will be declined or accepted. If the request is accepted, an authorization code is issued to merchant 24.

When a request for authorization is accepted, the available credit line of accountholder 22's account 32 is decreased. Normally, a charge for a payment card transaction is not posted immediately to accountholder 22's account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If accountholder 22 cancels a transaction before it is captured, a "void" is generated. If accountholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2). Further, in some embodiments, interchange network 28 and/or issuer bank 30 stores in database 120 information associated with a loyalty program such as, for example, an amount of loyalty points associated with the accountholder and/or the transaction.

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, accountholder account information, a type of transaction, savings information, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant 24's account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

As described above, the various parties to the payment card transaction include one or more of the parties shown in FIG. 1 such as, for example, accountholder 22, merchant 24, merchant bank 26, interchange network 28, issuer bank 30, and/or an issuer processor 21.

Figure 2:
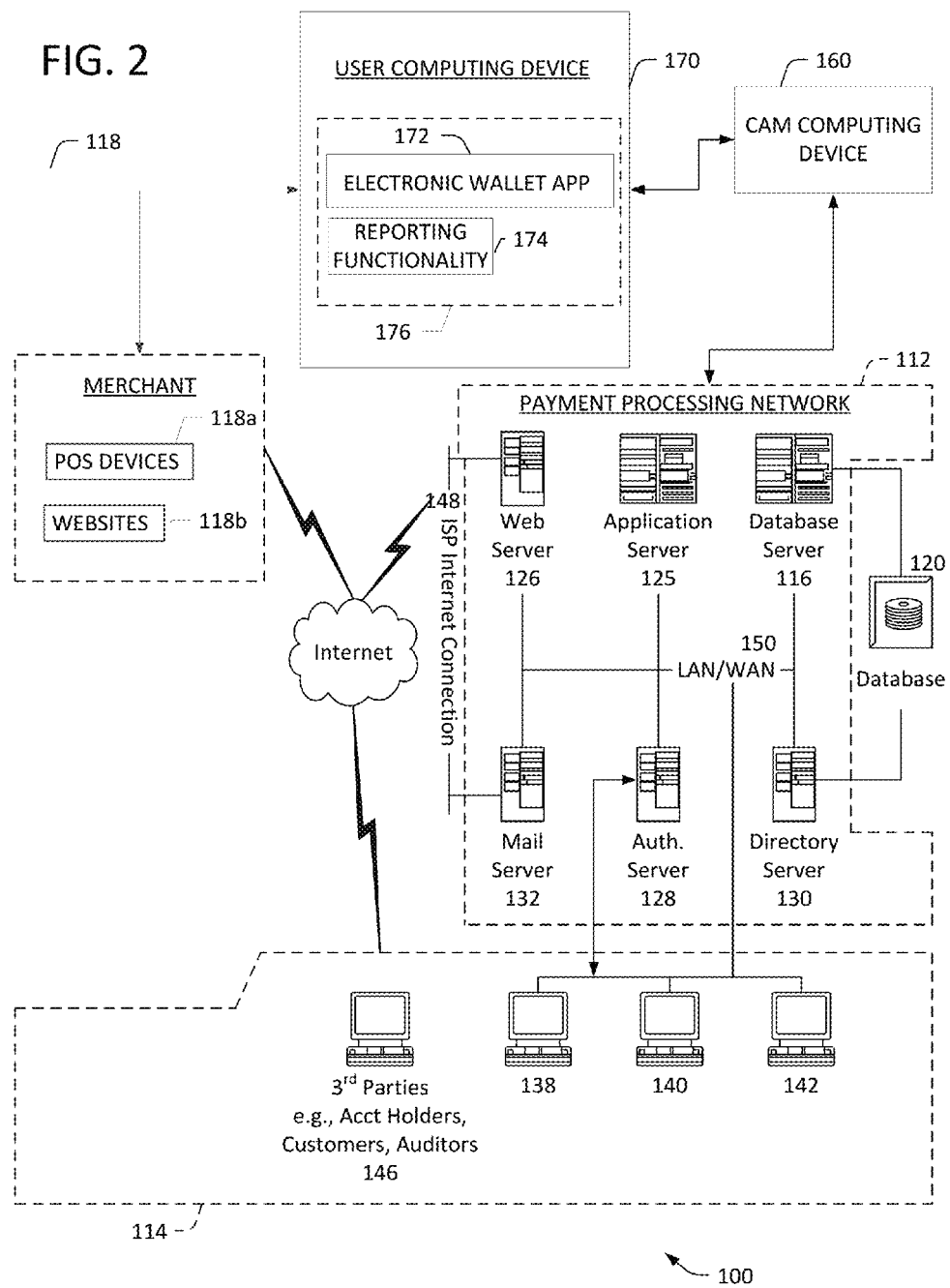

FIG. 2 is a simplified block diagram of an example compromised account management environment 100. Environment 100 shows a compromised account management (CAM) computing device 160 that is specifically programmed to manage compromise incidents for payment accounts. CAM computing device 160 is in communication with at least one user computing device 170, and a payment processor 112. CAM computing device 160 is configured to send and receive communications relating to account compromise to and from user computing device 170. CAM computing device 160 is also configured to send and receive account data to and from payment processor 112. Account data may include primary account numbers (PANs), tokens used in transactions in lieu of PANs, and other information relating to payment card accounts, such as the identity of the accountholder and the accountholder contact information. Account data may also include user computing device data, such as data relating to user computing device 170 that performs transactions using the account that is compromised.

User computing device 170 includes electronic wallet application 172. In one embodiment, electronic wallet application 172 is a software application including a set of computer-executable instructions that, when implemented by a processor within user computing device 170, perform one or more account management functions. Account management functions may include reviewing account balances, performing transactions, adding and removing payment card accounts, and the like. In one embodiment, the account management functions include reporting functionality 174. Reporting functionality 174 is configured to receive input relating to incidents of payment account compromise and communicate compromise incident data to CAM computing device 160. In another embodiment, electronic wallet application 172 and reporting functionality 174 are independent or interdependent software applications that together comprise electronic wallet reporting system 176.

During a transaction, user computing device 170 also communicates with merchant computing devices 118. Merchant computing devices include point-of-sale (POS) devices 118a and websites 118b. POS devices 118a include any devices designed to receive account data transmitted during a transaction, such as devices enabled with near field communication (NFC) technology. Merchants also operate websites 118b where accountholders may visit and purchase goods and services using computing devices similar to user computing device 170 which will transmit account data such as PANs or tokens to websites 118b.

In one embodiment, payment processor 112 represents a group of interconnected computers that includes database server 116, application server 125, web server 126, mail server 132, authentication server 128, and directory server 130, all in communication over a LAN/WAN network 150. In the exemplary embodiment, payment processor 112 communicates with external computers via internet connection 148. Authentication server 128 communicates with remotely located systems, e.g., user computing device 170. Authentication server 128 is also configured to communicate with other workstations 138, 140, and 142 as well.

Payment processor 112 is also in communication with computers 114 that, in the exemplary embodiment, are associated with issuing banks that issue payment cards to accountholders such as that using user computing device 170. Computers 114 are interconnected to the network through many interfaces including a network 115, such as a local area network (LAN) or a wide area network (WAN), dial-in-connections, cable modems, special high-speed Integrated Services Digital Network (ISDN) lines, and RDT networks. Computers 114 could be any device capable of interconnecting to the Internet including a smartphone, desktop or laptop computer, or other web-based connectable equipment. CAM computing device 160 is specifically configured to communicate compromise management information to and from computers 114 that are associated with issuing banks. Alternatively, payment processor 112 communicates compromise management information to computers 114 that are associated with issuing banks.

A database server 116 is connected to database 120, which contains information on a variety of matters, as described below in greater detail. In one embodiment, database 120 is stored on payment processor 112 and can be accessed by potential users of payment processor 112 or CAM computing device 160. In an alternative embodiment, database 120 is stored remotely from payment processor 112 and may be non-centralized.

Database 120 may include a single database having separated sections or partitions or may include multiple databases, each being separate from each other. Database 120 may store transaction data generated as part of sales activities and savings activities conducted over the processing network including data relating to merchants, account holders or customers, issuers, acquirers, savings amounts, savings account information, and/or purchases made. Database 120 may also store account data including at least one of an accountholder name, an accountholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by an accountholder from a merchant, and authorization request data. Database 120 may also store identifiers for a particular e-wallet account, for example a customer username and password, a device identifier (e.g., computer name, mobile device identifier, IMEI, telephone/cell phone number), customer address, type of e-wallet application, and any associated information. Database 120 may also store compromise management data, e.g., forensic data surrounding particular compromise events, merchants and accountholders associated with the compromise, amount of financial loss, types of compromise events (loss, theft, damage, fraud, etc.), and any related data. Database 120 may also store statistical analysis data regarding each compromise event processed by CAM computing device 160.

In the example embodiment, one of computers 114 may be associated with an acquirer bank while another one of computers 114 may be associated with issuer bank 30 (shown in FIG. 1). Computers 114 may comprise third party computers 146, and issuer devices 138, 140, and 142. In the example embodiment, payment processor 112 is associated with a network interchange, such as interchange network 28, and may be referred to as an interchange computer system or a payment processing computing device. Payment processor 112 may be used for processing transaction data. In addition, computers 114 may include a computer system associated with at least one of an online bank, a bill payment outsourcer, an acquirer bank, an acquirer processor, an issuer bank associated with a transaction card, an issuer processor, a remote payment system, a token requestor, a token provider, and/or a biller.

In the example embodiment, CAM computing device 160 does not consist solely of generic computer hardware, nor does it require merely generic computer instructions to perform the above functions. Rather, CAM computing device 160 is a specific and customized computer device built to perform the specific function of managing compromise events relating to payment cards, using a purpose-built API platform. In the example embodiment, CAM computing device 160 is configured to communicate in specific ways with electronic wallet applications 172 and payment processor 112. CAM computing device 160 is specifically configured to perform one or more of the data manipulation tasks described herein, such as receiving a first notification message including a first account identifier, the first notification message generated by the user computing device via a reporting functionality, wherein the first notification message indicates that a first account associated with the first account identifier has been compromised, processing the first notification message, determining at least one issuer associated with the first account identifier, generating a second notification message including the first account identifier and an issuer identifier, and transmitting the second notification message to the at least one issuer.

Figure 3:
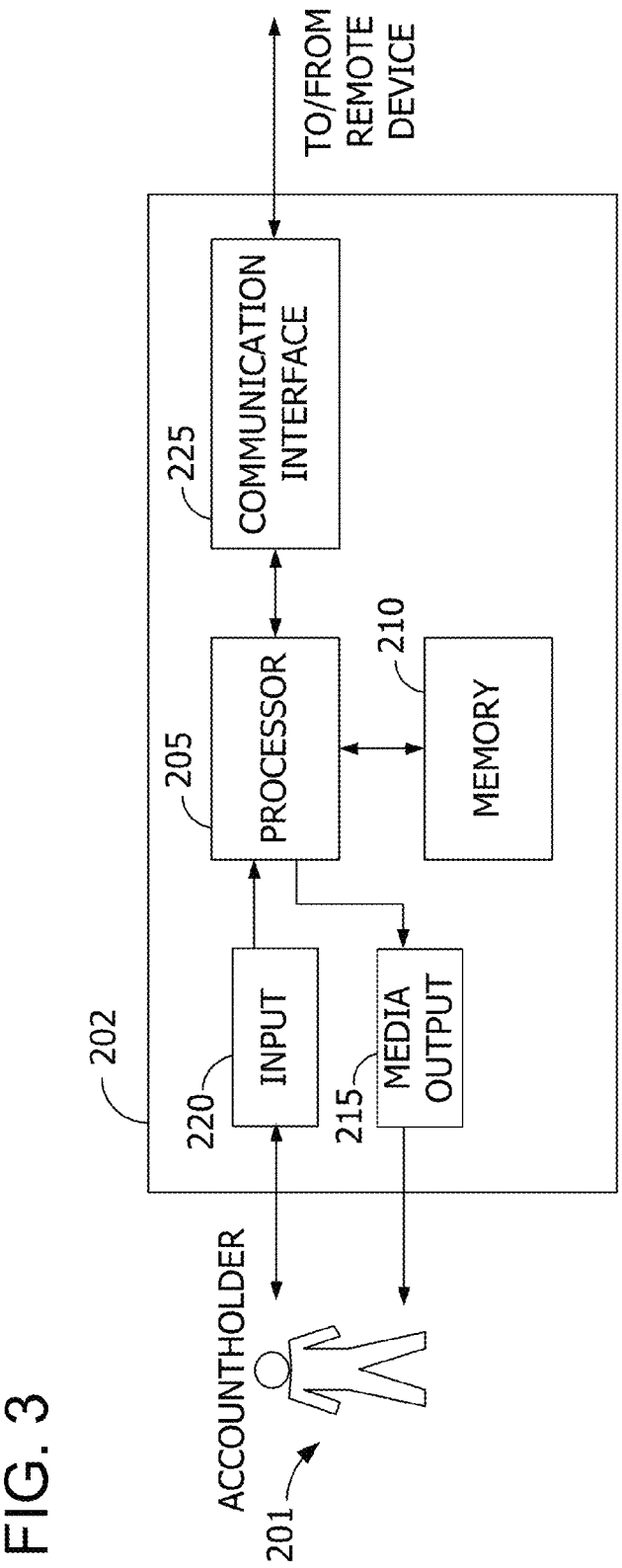

FIG. 3 illustrates an example configuration of a user system (similar to user computing device 170 shown in FIG. 2) operated by an accountholder 201, such as a consumer who uses a payment card issued by an issuing bank and associated with a payment transaction account, shown in FIG. 1. User system 202 may include, but is not limited to, any computing devices that use a computer processor and memory and are capable of operating software-based instructions to send and transmit compromise event data and display related information. These include, but are not limited to, laptops, smartphones, tablets, desktop computers, computers accessed remotely via virtual or remote networks, smartwatches, and the like. In the example embodiment, user system 202 includes a processor 205 for executing instructions. In some embodiments, executable instructions are stored in a memory area 210. Processor 205 may include one or more processing units, for example, a multi-core configuration. Processor 205 is configured to at least operate based on software instructions defining an electronic wallet application, such as one used to manage multiple financial accounts, including payment transaction accounts. Memory area 210 is any device allowing information such as executable instructions and/or written works to be stored and retrieved. Memory area 210 may include one or more computer readable media.

User system 202 also includes at least one media output component 215 for presenting information to accountholder 201. Media output component 215 is any component capable of conveying information to accountholder 201. In some embodiments, media output component 215 includes an output adapter such as a video adapter and/or an audio adapter. An output adapter is operatively coupled to processor 205 and operatively connectable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from accountholder 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively connectable to a remote device such as CAM computing device 160. In one embodiment, user system 202 communicates compromise event data with CAM computing device 160, which may in turn communicate with computers 114 such as those associated with an issuing bank. In another embodiment, user system 202 communicates directly with computers 114 associated with an issuing bank. Communication interface 225 may include, for example, a wired or wireless network adapter or a wireless data transceiver for use with a mobile phone network, Global System for Mobile communications (GSM), 3G, 4G, or other mobile data network or Worldwide Interoperability for Microwave Access (WIMAX), or the like.

Stored in memory area 210 are, for example, computer readable instructions for providing a user interface to accountholder 201 via media output component 215 and, optionally, receiving and processing input from input device 220. A user interface may include, among other possibilities, a web browser or client application. Web browsers enable users, such as accountholder 201, to display and interact with media and other information typically embedded on a web page or a website from CAM computing device 160. A client application allows accountholder 201 to interact with a server application from CAM computing device 160.

Figure 4:
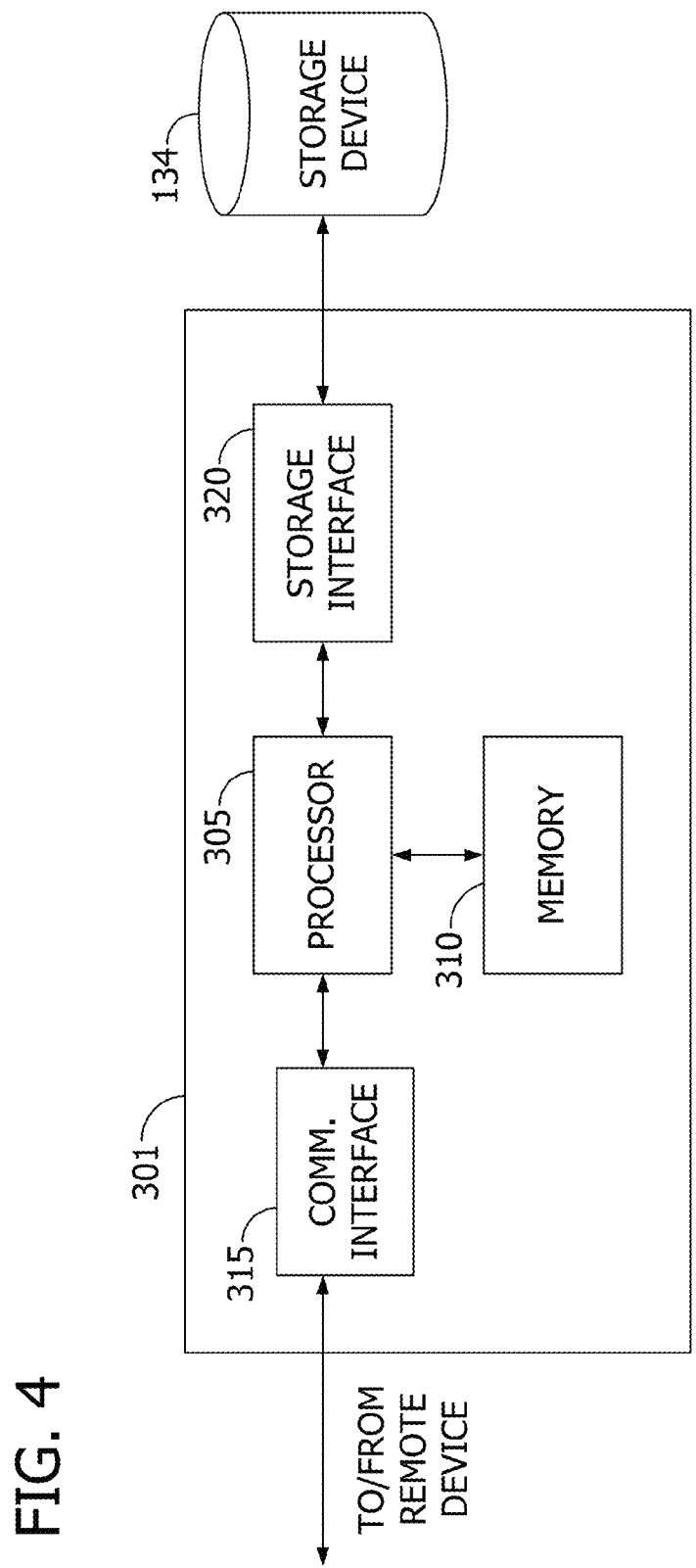

FIG. 4 illustrates an example configuration of a server system such as CAM computing device 160 shown in FIG. 2 used for compromised account management. Server system 301 may include, but is not limited to, database server 116, or CAM computing device 160 (shown in FIG. 2). In some embodiments, server system 301 is similar to CAM computing device 160 (shown in FIG. 2).

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, Python, JavaScript, or other suitable programming languages, etc.).

Processor 305 is operatively coupled to a communication interface 315 such that server system 301 is capable of communicating with a remote device such as a user system or another server system 301. For example, communication interface 315 may communicate with user computing device 170 and computers 114 via the Internet, as illustrated in FIG. 2.

Processor 305 may also be operatively coupled to a storage device 134, similar to database 120 in FIG. 2. Storage device 134 is any computer-operated hardware suitable for storing and/or retrieving data. In some embodiments, database 120 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
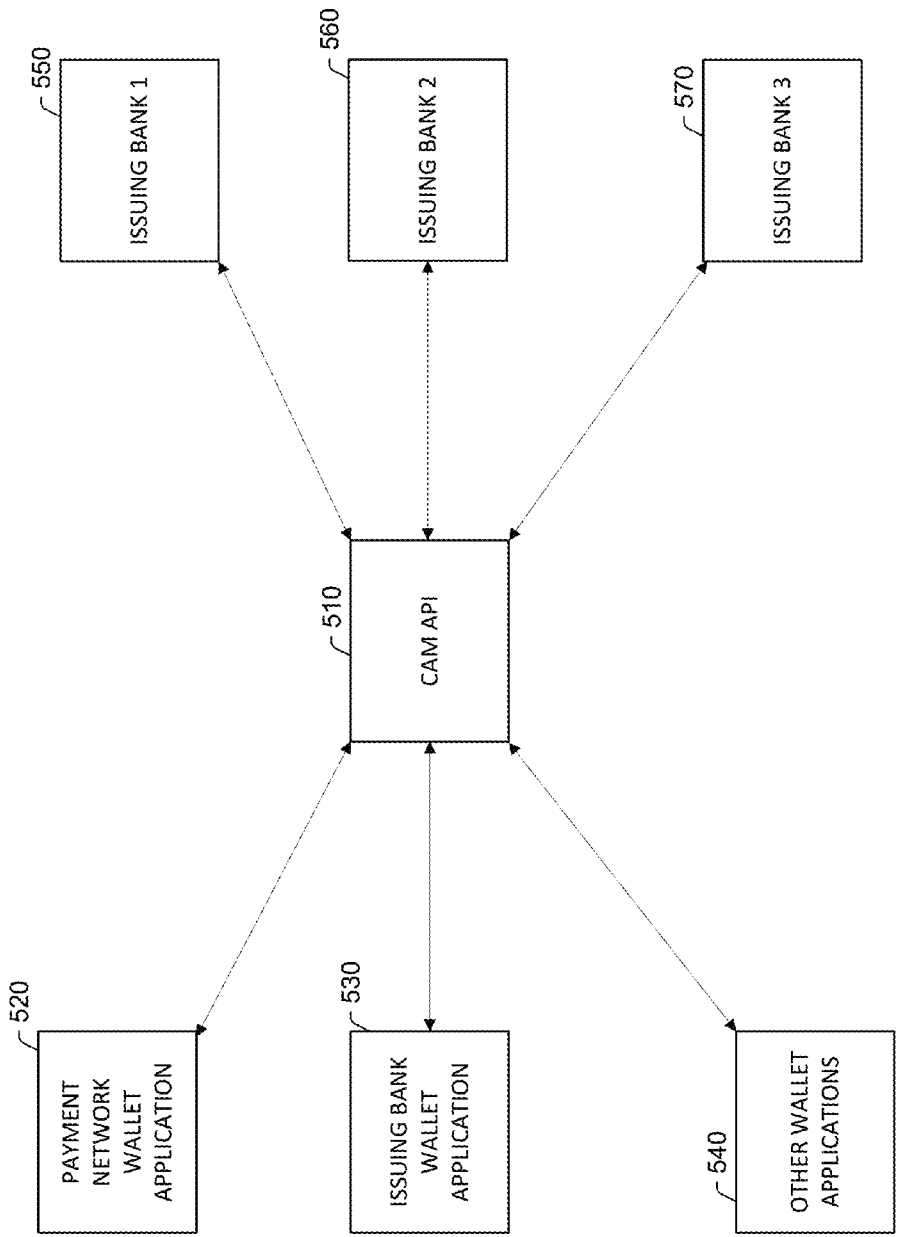

FIG. 5 shows a compromised account management (CAM) computer device 510 (similar to CAM computing device 160 shown in FIG. 2) in communication with other devices to manage payment card compromise events. In the exemplary embodiment, CAM computing device 510 is in communication with multiple different electronic wallet applications, such as a payment network e-wallet application 520, an issuing bank e-wallet application 530, and other e-wallet applications 540. Other e-wallet applications 540 may be associated with credit card issuing companies (e.g., Capital One®; CAPITAL ONE is a registered trademark of Capital One, headquartered in McLean, Va., USA), other payment processors (e.g., Visa®; VISA is a registered trademark of Visa Inc., headquartered in Foster City, Calif., United States) and software suites relating to financial card management (e.g., Apple Pay®; APPLE PAY is a registered trademark of Apple Inc., headquartered in Cupertino, Calif., United States). These e-wallet applications are similar to electronic wallet application 172 depicted in FIG. 2. CAM computing device 510 is also in communication with multiple issuing banks, e.g., issuing banks 550, 560, and 570 via the existing financial transaction payment network.

In the exemplary embodiment, CAM computing device 510 receives card compromise event data from, e.g., payment network wallet application 520. CAM computing device 510 processes this data, which includes at least determining the type of compromise and the issuing bank for the card that has been compromised. Having determined the related issuing bank, CAM computing device 510 contacts the issuing bank, e.g., issuing bank 550. CAM computing device 510 communicates details of the compromise to issuing bank 550 and receives communications back from issuing bank 550 relating to further steps to be taken. In this embodiment, CAM computing device 510 communicates back to payment network wallet application 520 any instructions received from issuing bank 550. In other embodiments, CAM computing device 510 communicates with multiple issuing banks 550, 560, and 570 as a result of a single compromise incident and communicates back to a single wallet application having processed instructions from multiple issuing banks 550, 560, and 570.

As will be appreciated by those having skill in the art, CAM computing device 510 is agnostic as to the type of issuing bank, wallet application, payment transaction card, compromise incident, communication protocol, software standard, or financial standard such as currency. CAM computing device 510 is configured to be able to manage compromise of a single card or an entire wallet containing multiple cards.

Figure 6:
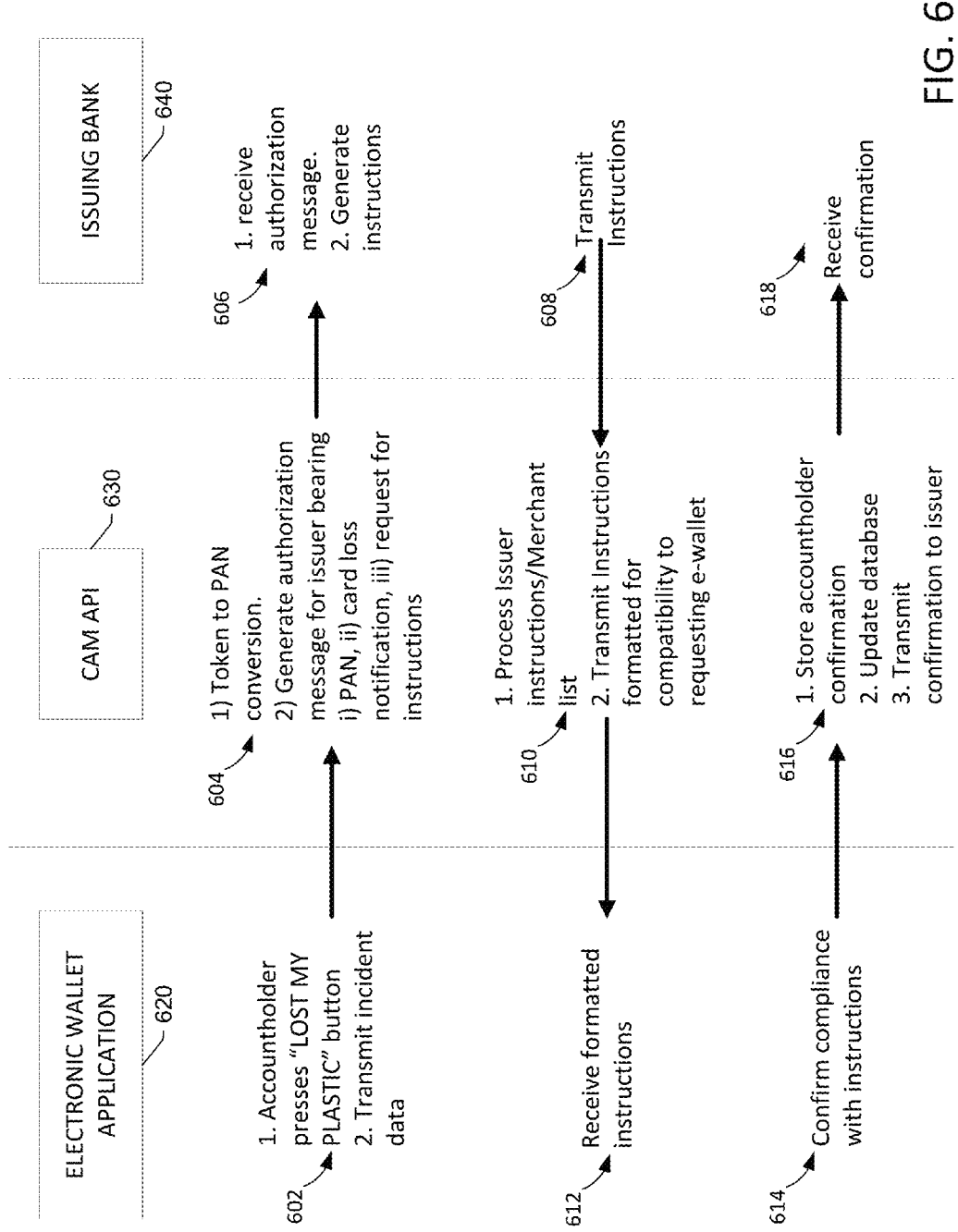

FIG. 6 shows the operation of a CAM computing device 510 during a single payment card compromise incident in greater detail. In the exemplary embodiment, communications are transmitted and received among an example electronic wallet application 620, CAM API 630 (similar to CAM computing device 510), and issuing bank 640 (similar to issuing banks 550, 560, and 570 shown in FIG. 5). In the exemplary embodiment, CAM API 630 takes the form of an application programming interface (API) that can communicate with a variety of other software platforms.

In the exemplary embodiment, at 602, an accountholder (such as accountholder 201 in FIG. 2) presses, taps, or otherwise activates a feature called "LOST MY PLASTIC." In the exemplary embodiment, this is a button that can be pressed as part of, for example, a software application on a user computing device display. Pressing the button initiates a communication to CAM API 630. The communication at 602 includes at least an account identifier for one or more of the accountholder's accounts, such as a token, a hash, a key number, or some other alphanumeric identifier that is stored on the accountholder's device in lieu of the account's primary account number (PAN). The communication at 602 may also include details of the compromise incident such as type of compromise. CAM API 630 may also be configured to receive a date/timestamp and GPS-based location of the computing device at the instant the "LOST MY PLASTIC" button was pressed.

At 604, CAM API 630 initiates a series of steps. At step 1, CAM API 630 retrieves the actual PAN by performing a lookup in a database (similar to database 120) for the PAN associated with the token transmitted by the user computing device. CAM API 630 also retrieves an identifier for the relevant issuing bank, such as the name of the bank that issued the account, a computer name for a computer associated with the issuing bank, and the like. At step 2, CAM API 630 generates a message destined for the issuing bank which, in some embodiments, is similar to an authorization request message. CAM API 630 is additionally configured to determine the communication format or protocol that is associated with the issuing bank. For example, Bank A may accept authorization messages in a proprietary format, Bank B may use a separate proprietary format, and Bank C may use a commonly used format that is nevertheless incompatible with the Bank A and Bank B communication formats. To address this, CAM API 630 is configured to convert the authorization message into a format determined based on the issuing bank in question, before transmission. In one embodiment, the generated message includes the PAN, a notification that the plastic payment card is compromised, and a request for further instructions.

At 606, issuing bank 640 receives the authorization message and determines how to proceed. In one embodiment, issuing bank 640 generates instructions for CAM API 630 to follow and/or to communicate to e-wallet application 620. Issuing bank 640 communicates a new PAN generated as a result of the compromise, and/or other notifications such as that the account is frozen, or that funds are still available for use via other means (such as by bank draft or check). In the exemplary embodiment, issuing bank 640 instructs that the compromised plastic card will no longer be accepted for transactions. Issuing bank 640 further instructs that a new plastic card is being mailed to the accountholder, and/or that the accountholder may continue to use e-wallet application 620 for transactions.

In another embodiment, issuing bank 640 generates notifications or instructions destined for the payment processor associated with CAM API 630. In yet another embodiment, issuing bank 640 merely instructs CAM API 630 that issuing bank 640 will contact e-wallet application 620 directly, or contact the accountholder via other means, such as by phone, postal mail, email, text message, push notifications, and/or online banking website notifications. At 608, issuing bank 640 transmits its communications to CAM API 630.

At 610, CAM API 630 receives the communication from issuing bank 640 and begins to process the included instructions. In one embodiment, CAM API 630 determines the portion of the communication intended for e-wallet application 620, converts that portion into a format suitable for e-wallet application 620, and transmits it. As with the issuing bank example above, various e-wallet applications use different communication formats. For example, Apple Pay may use a communications protocol that is incompatible with a communications protocol used by Google Wallet. Processing the instructions also includes storing in permanent or at least temporary storage the new PAN issued by issuing bank 640.

In another embodiment, CAM API 630 stores previously issued instructions received from each issuing bank, and collates or correlates the instructions at least by type of compromise and by issuer. For example, CAM API 630 may determine that US Bank always cancels the card account and mails a new card if the type of compromise is theft. Then CAM API 630 will associate those actions with "US Bank" and "theft" in, for example, database 120. CAM API 630 may be configured, with the proper approval and decisioning protocol or flow from the issuing bank, to automatically generate those instructions the next time a US Bank payment card is reported as stolen. In this embodiment, CAM API 630 is configured to automatically transmit the relevant instructions to the next accountholder that reports theft of a US Bank card, without having to first communicate with the issuing bank, i.e., US Bank. In this embodiment, CAM API 630 may also be configured to receive periodic updates to decisioning protocols from issuing banks, thereby increasing efficiency and accuracy.

In another embodiment, the compromise of one plastic card may require action for more than one card. CAM API 630 is configured to store associations between multiple cards, for example, where a husband-wife couple shares a joint checking account but each person has an individual card. In the event that, for example, the husband loses his card due to theft, CAM API 630 is configured to transmit the instructions of issuing bank 640 not just to the e-wallet application on the husband's computing device, but also to the e-wallet application on the wife's computing device. Only one card is compromised in this example, but both parties are affected since a thief's unauthorized withdrawals from the account will impact both parties.

In yet another embodiment, CAM API 630 has access to a list of all merchants that are using the now-compromised card for "card-on-file" (CoF) and/or "recurring payment" (RP) transactions. In such transactions, the merchant stores payment card information (e.g., PAN, security code, expiration date, card type etc.) in its database and uses it for recurring payments, rather than for the accountholder to present the card each time. Similarly, online merchants such as Amazon.com may store card information for use in online transactions. In the husband-wife example above, the husband may have his payment card information stored at, e.g., an RP merchant such as a health club, an online merchant such as Amazon.com, or even a one-time situation such as the husband having provided his payment card information to a hotel for incidental expenses during his hotel stay. CAM API 630 may store its own CoF merchant list, or alternatively may receive a list of one or more CoF merchants associated with the compromised card from the issuer. In such an example, CAM API 630 is configured to generate a list of all merchants for whom the compromised card's information is stored for CoF transactions. CAM API 630 transmits this list to e-wallet application 620 to inform the accountholder that the merchants on the list will need to update their stored payment card information. In one embodiment, CAMP API 630 transmits this list and requests permission from the accountholder to notify each merchant of the compromise and provide each merchant with the updated card information, such as a new PAN generated by issuing bank 640. Alternatively, CAM API 630 simply transmits this list for the accountholder to notify each merchant himself.

At 612, e-wallet application 620 receives instructions generated as a result of the compromise incident. In the exemplary embodiment, the accountholder reviews these instructions and determines how to proceed. At 614, the accountholder confirms compliance with the instructions through e-wallet application 620 and transmits the confirmation to CAM API 630. CAM API 630 receives this confirmation, and stores it. In one embodiment, CAM API 630 updates a database (for example, database 120 in FIG. 2) with a new PAN issued by issuing bank 640, and associates the new PAN with the token initially transmitted by e-wallet application 620. In another embodiment, CAM API 630 generates a new token, transmits it to e-wallet application 620 for use with the particular account that was compromised, and associates the new token with the new PAN. For at least these embodiments, CAM API 630 may use a customer username as a primary key in database 120 with which to associate the new PAN and/or new token.

Alternatively, the accountholder may decline to follow issuing bank 640 instructions. CAM API 630 may be configured to notify the accountholder that, barring confirmation of the issuing bank instructions, the e-wallet account for the compromised payment card will be disabled. At 616, CAM API 630 transmits the accountholder's confirmation to issuing bank 640. At 618, issuing bank 640 receives the confirmation message and has the opportunity to update its records for the particular accountholder.

Figure 7:
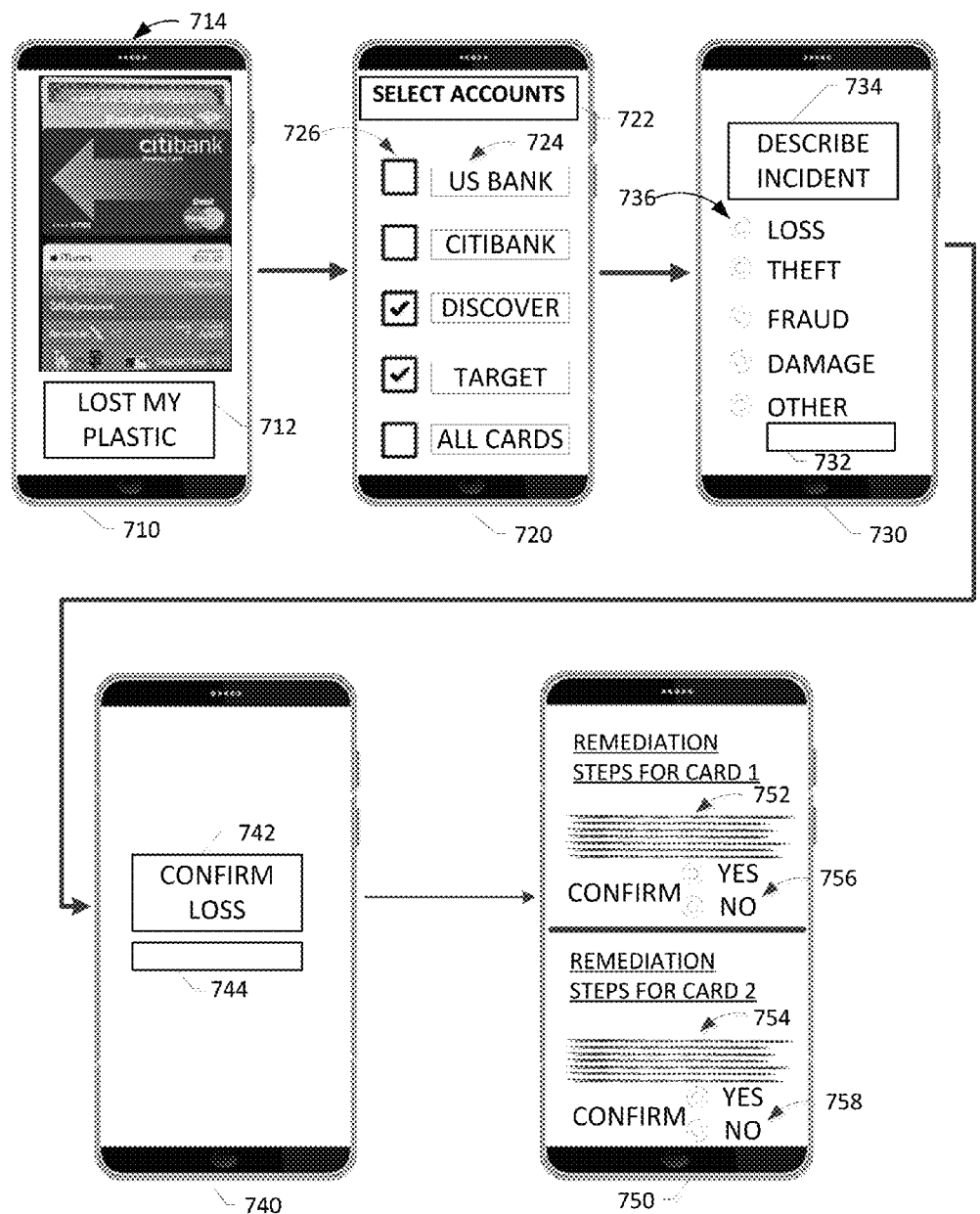

FIG. 7 illustrates a series of display states for an exemplary e-wallet application as it communicates with CAM API 630. It should be noted that CAM API 630 may be associated with a payment processor (such as MasterCard®) such that CAM API 630 routes traffic between e-wallet applications and issuing banks via payment processor computers. Alternatively, CAM API 630 may be a standalone system independent of payment processor computers. In the alternative embodiment, CAM computing device 510 is composed of a customer-facing e-wallet client, and a server hosting CAM API 630. In this embodiment, CAM computing device 510 functions as both the e-wallet and the interface with issuing banks. For example, CAM API 630 may receive compromise incident data from an e-wallet application and transmit it directly to an issuing bank without having to communicate with another entity, such as a payment processor.

Screen 710 shows an exemplary display of an e-wallet, showing visual representations 714 of a number of payment card accounts. As will be appreciated by those in the art, each account displayed has an identifier, or token, associated with it stored on the computing device where the e-wallet application is installed. In the exemplary embodiment, the token, rather than the PAN, is transmitted from the computing device. Screen 710 also displays a button 712 labeled "Lost My Plastic."

In one embodiment, an accountholder activates button 712 shown in screen 710. CAM API 630 is configured to cause the e-wallet application to display screen 720 as a result of the activation of button 712. Screen 720 in turn shows a sample account list 724 of each account that was previously added to the e-wallet with a button 722 titled "Select Accounts." Each account in account list 724 has an associated checkbox in checkbox list 726. In the exemplary embodiment, the accountholder reviews account list 724 and selects the accounts that have been compromised, by checking the associated checkbox(es) from checkbox list 726. Alternatively, the accountholder may check the box for "All Accounts" to communicate that the plastic cards for all the accounts associated with the e-wallet have been compromised. Checking the "All Accounts" checkbox results in the display updating to show every checkbox in checkbox list 726 being checked (not shown). Once the accountholder has selected all compromised accounts, the accountholder presses button 722 (marked "Select Accounts") to proceed to the next screen.

CAM API 630 is configured to cause the e-wallet to display screen 730 as a result of activating button 722. In the exemplary embodiment, screen 730 displays screen heading 734 titled "Describe Incident," along with radio buttons 736 marked with various types of compromise, such as "loss", "theft", "fraud", etc. Another radio button in radio buttons 736 is marked "Other" with an associated text box 732. Selecting the radio button for "Other" and text box 732 enables an accountholder to enter text describing a compromise event that may not be covered by the other listed types.

In the exemplary embodiment, the accountholder selects all compromised accounts first, and then activates button 722 to "Select accounts" and proceed to screen 730. In a related embodiment, checking a single checkbox on screen 720 may cause screen 730 to be shown, such that the accountholder is prompted to describe the compromise incident for each individual account. In this embodiment, screen 730 may have additional controls (not shown) to enable the accountholder to return to screen 720 to select more accounts.

CAM API 630 is configured to present screen 740 on the e-wallet application once screen 730 is completed. Screen 740 requires the accountholder to confirm the compromise event. In the exemplary embodiment, the accountholder sees a heading 742 titled "Confirm Loss" along with a text box 744. In this embodiment, the accountholder may be required to enter a confirmation code in text box 744. CAM API 630 may be configured to transmit a confirmation code to, for example, the accountholder's phone, email or postal mail address in order to confirm that the "Lost My Plastic" button 712 on screen 710 was not activated by accident or by an unauthorized actor such as a child.

Once the confirmation code is entered, CAM API 630 is configured to confirm the compromise and communicate this confirmation to an issuing bank (such as issuing bank 640 in FIG. 6). CAM API 630 is configured to then display screen 750 showing remediation steps for each compromised account. Remediation steps may be received from various issuing banks upon receiving the confirmation message from the accountholder via CAM API 630. In the exemplary embodiment, CAM API 630 causes the e-wallet to display remediation steps 752 for one account and remediation steps 754 for a different account. For example, remediation steps 752 may include "1. Per Citibank, you may continue using your phone for purchases. 2. You should receive a new plastic card bearing a new account number from Citibank via mail in 3-5 business days."

Upon review, the accountholder can confirm compliance with the remediation steps 752 and 754 by using radio buttons 756 and 758 respectively. In the exemplary embodiment, the accountholder confirms by selecting the radio button for "Yes," CAM API 630 communicates this confirmation to the associated issuing bank and returns the accountholder to screen 710. Alternatively, if the accountholder declines to confirm by selecting the radio button for "No," CAM API 630 communicates the decline to the issuing bank and may display other instructions or notifications (not shown) to the accountholder after further communication with the issuing bank.

Figure 8:
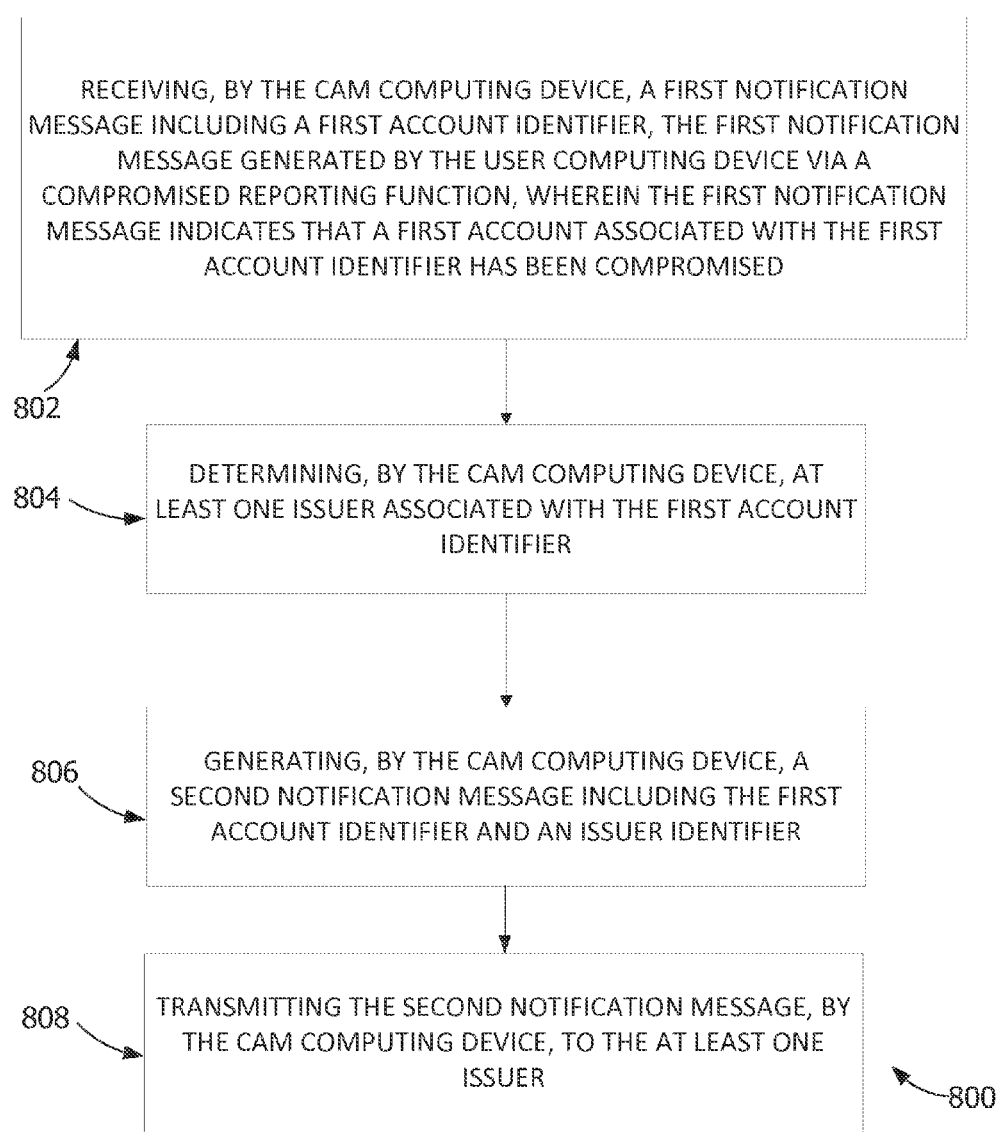

FIG. 8 shows an example method 800 by which the CAM computing device manages compromised accounts. In the exemplary embodiment, CAM computing device 510 receives 802 a first notification message including a first account identifier, the first notification message generated by the user computing device via a compromised reporting function, wherein the first notification message indicates that a first account associated with the first account identifier has been compromised. CAM computing device 510 determines 806 at least one issuer associated with the first account identifier. CAM computing device 510 generates 808 a second notification message including the first account identifier and an issuer identifier. CAM computing device transmits 810 the second notification message to the at least one issuer.

Figure 9:
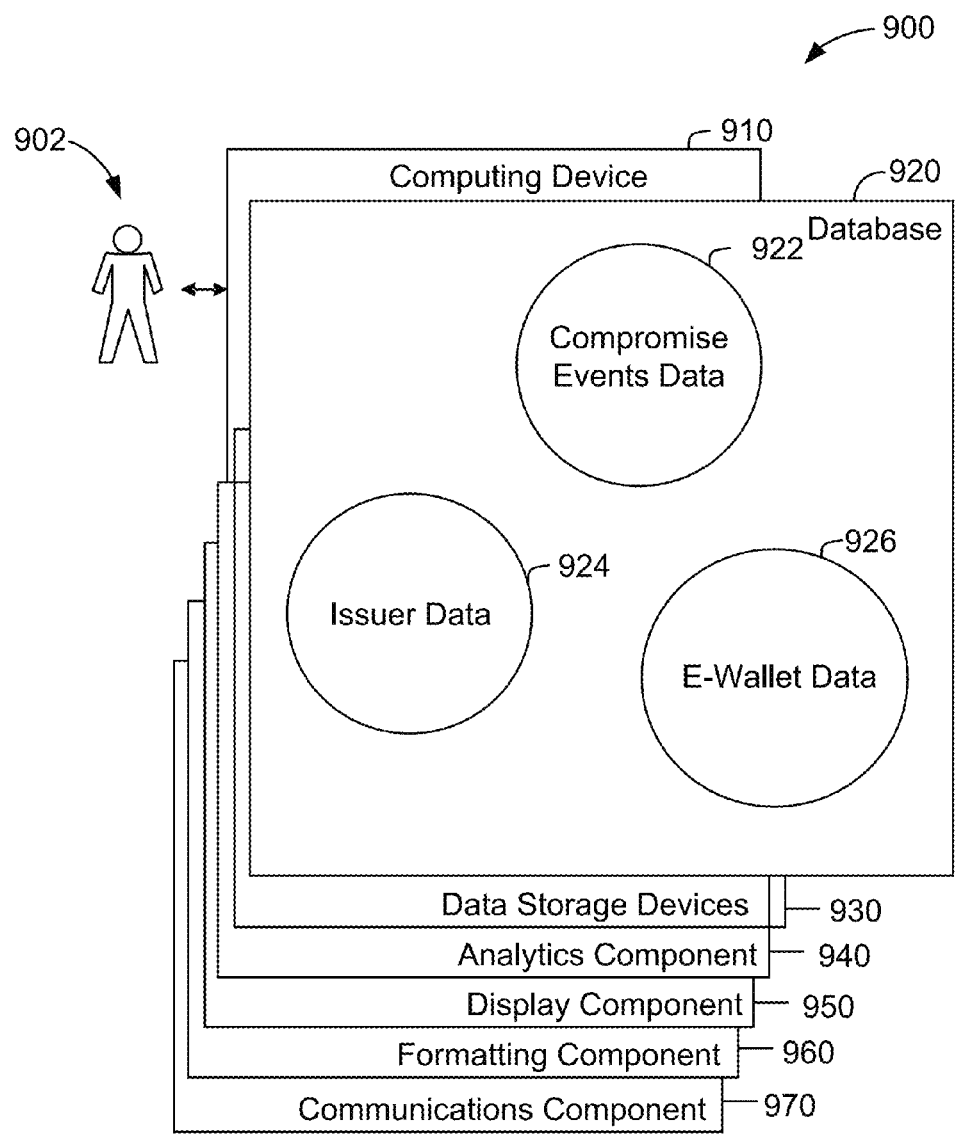

FIG. 9 shows an example configuration of a database within a computing device, along with other related computing components, that may be used to manage incidents of payment card account compromise. In some embodiments, computing device 910 is similar to CAM computing device 160, CAM computing device 510, and CAM API 630 (shown in FIGS. 2, 5, and 6, respectively). An accountholder 902 may access computing device 910 in order to manage payment card accounts in the event that one or more associated plastic payment cards are lost, stolen etc. In some embodiments, database 920 is similar to database 120 (shown in FIG. 2). In the example embodiment, database 920 includes compromise events data 922, issuer data 924, and accountholder data 926. Compromise events data 922 includes data regarding each compromise event, such as date, time, location, merchant ID, nature of compromise, any patterns of recurrence (repeated thefts at same merchant, repeated loss of card at the same ATM, unauthorized transactions detected by accountholder, etc.) Issuer data 924 includes data about each issuer that computing device 910 may be in communication with, including issuer identifiers, associated communication protocols, issuer contact information, issuer computer system data, issuer instructions for common compromise events, and the like. E-wallet data 926 includes data regarding various e-wallet application providers, associated communication protocols, a listing of accountholders by e-wallet type, individual e-wallet accounts in communication with computing device 910, and the accountholders, payment card accounts, and tokens associated with each individual e-wallet account.

Computing device 910 also includes data storage devices 930. Computing device 910 also includes analytics component 940 that is configured to analyze each compromise event and detect patterns of compromise. For example, particular types of compromise (e.g., loss) may occur at particular times (late night) or places (certain merchants). Analytics component 940 is configured with, for example, specific frequency thresholds (e.g., determine and report pattern of compromise at merchant A if more than 3 accountholders report payment card loss at merchant A). Computing device 910 also includes display component 950 that is configured to display at least communications received from issuing banks (such as remediation steps 752 and 754 shown in FIG. 7), other information generated by computing device 910, and various controls used to manage the compromise incident (buttons, checkboxes, radio buttons etc.) Display component 950 may also be configured to display a complete e-wallet application, where computing device 910 functions as the e-wallet itself, similar to CAM API 630 as described with reference to FIG. 7. Computing device 910 also includes formatting component 960, which is configured to convert and/or translate communications received from issuing banks and e-wallet applications for transmission to the appropriate recipient. For example, formatting component 960 may convert communications received from issuing bank A in protocol A into a different protocol B that is used by e-wallet B, for transmission to e-wallet B. Computing device 910 also includes communications component 970 that is configured to communicate at least with issuing bank computers and e-wallet applications installed on various computing devices.

As will be appreciated based on the foregoing specification, the described embodiments of the disclosure may be implemented using computer programming or engineering techniques including computer software, firmware, hardware or any combination or subset thereof, wherein the technical effect is to communicate between issuing banks, payment processors, and electronic wallet applications to manage payment card accounts in the event that the plastic payment card is compromised. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of managing a compromised account stored within an electronic wallet, on a user computing device, the method implemented using a compromised account management (CAM) computing device in communication with a database, said method comprising:
   receiving, by the CAM computing device via a compromised account management application interface (CAM API), a first notification message including an account identifier, the first notification message generated by the user computing device via a compromised account reporting function, wherein the first notification message indicates that an account associated with the account identifier assigned to an accountholder has been compromised;
   performing a lookup within the database, by the CAM computing device, for a primary account number (PAN) associated with the account identifier;
   retrieving, by the CAM computing device, the PAN from the database;
   determining, by the CAM computing device, at least one issuer associated with the PAN;
   generating, by the CAM computing device, a second notification message including the account identifier and an issuer identifier, wherein the second notification message is generated using a first communication protocol;
   determining, by the CAM computing device, a second communication protocol compatible with an issuer computing device associated with the issuer identifier;
   matching, by the CAM computing device, the first communication protocol to the second communication protocol;
   converting, by the CAM computing device, the first communication protocol into the second communication protocol when the first communication protocol does not match the second communication protocol;
   transmitting the second notification message, by the CAM computing device over a payment network, to the at least one issuer associated with the issuer computing device;
   receiving a response message from the at least one issuer including at least one accountholder instruction, wherein the at least one accountholder instruction includes a token enabling the accountholder to use the compromised account stored within the electronic wallet; and
   updating the database based on the response message from the at least one issuer.

2. A method in accordance with claim 1, further comprising
   transmitting, by the CAM computing device, the at least one accountholder instruction from the at least one issuer to the user computing device; and
   displaying, on the user computing device, the at least one accountholder instruction, including one or more actionable steps instructing the accountholder on how to proceed after the account has been compromised.

3. A method in accordance with claim 1, further comprising:
   receiving at least one merchant identifier from the at least one issuer, wherein the at least one merchant identifier is associated with a merchant using the account for card-on-file transactions;

assembling, by the CAM computing device, a combined merchant list, including the at least one merchant identifier received from the at least one issuer; and transmitting the combined merchant list to the user computing device.

4. A method in accordance with claim 1, further comprising:

receiving, from the user computing device, a first set of incident data, wherein the first set of incident data comprises one or more of a time, a date, a location, and a type of transaction card associated with the compromised account.

5. A method in accordance with claim 4, further comprising:

determining whether the first set of incident data matches a second, previous set of incident data;

identifying a pattern of compromise within the first set of incident data; and generating a further action request for the issuer based on the identified pattern of compromise.

6. A method in accordance with claim 5, wherein the pattern of compromise comprises at least one of: a particular time of day that a number of payment transaction cards beyond a predetermined threshold are compromised, and a particular location, including a particular point-of-sale (POS), where a number of payment transaction cards beyond a predetermined threshold are compromised.

7. A system for managing a compromised account stored within an electronic wallet on a user computing device, the system comprising:

a database configured to store data associated with the account;

a compromised account management (CAM) computing device in communication with the database, the CAM computing device further configured to:

receive, via a compromised account management application interface (CAM API), a first notification message including an account identifier, the first notification message generated by the user computing device via a compromised account reporting function, wherein the first notification message indicates that an account associated with the account identifier assigned to an accountholder has been compromised;

perform a lookup within the database for a primary account number (PAN) associated with the account identifier;

retrieve the PAN from the database;

determine at least one issuer associated with the PAN;

generate a second notification message including the account identifier and an issuer identifier, wherein the second notification message is generated using a first communication protocol;

determine a second communication protocol compatible with an issuer computing device associated with the issuer identifier;

match the first communication protocol to the second communication protocol;

convert the first communication protocol into the second communication protocol when the first communication protocol does not match the second communication protocol;

transmit, over a payment network, the second notification message to the at least one issuer associated with the issuer computing device;

receive a response message from the at least one issuer including at least one accountholder instruction, wherein the at least one accountholder instruction includes a token enabling the accountholder to use the compromised account stored within the electronic wallet; and update the database based on the response message from the at least one issuer.

8. A system in accordance with claim 7, wherein the CAM computing device is further configured to:

transmit the at least one accountholder instruction from the at least one issuer to the user computing device; and display, on the user computing device, the at least one accountholder instruction, including one or more actionable steps instructing the accountholder on how to proceed after the account has been compromised.

9. A system in accordance with claim 7, wherein the CAM computing device is further configured to:

receive at least one merchant identifier from the at least one issuer, wherein the at least one merchant identifier is associated with a merchant using the account for card-on-file transactions;

assemble a combined merchant list, including the at least one merchant identifier received from the at least one issuer; and transmit the combined merchant list to the user computing device.

10. A system in accordance with claim 7, wherein the CAM computing device is further configured to:

receive, from the user computing device, a first set of incident data, wherein the first set of incident data comprises one or more of a time, a date, a location, and a type of transaction card associated with the compromised account.

11. A system in accordance with claim 10, wherein the CAM computing device is further configured to:

determine whether the first set of incident data matches a second, previous set of incident data;

identify a pattern of compromise within the first set of incident data; and generate a further action request for the issuer based on the identified pattern of compromise.

12. A system in accordance with claim 11, wherein the pattern of compromise comprises at least one of: a particular time of day that a number of payment transaction cards beyond a predetermined threshold are compromised, and a particular location, including a particular point-of-sale (POS), where a number of payment transaction cards beyond a predetermined threshold are compromised.

13. A non-transitory computer readable medium that includes computer executable instructions for managing a compromised account stored within an electronic wallet on a user computing device, wherein when executed by a compromised account management (CAM) computing device in communication with a database, the computer executable instructions cause the CAM computing device to:

receive, via a compromised account management application interface (CAM API), a first notification message including an account identifier, the first notification message generated by the user computing device via a compromised account reporting function, wherein the first notification message indicates that an account associated with the account identifier assigned to an accountholder has been compromised;

perform a lookup within the database for a primary account number (PAN) associated with the account identifier;

retrieve the PAN from the database;

determine at least one issuer associated with the PAN;

generate a second notification message including the account identifier and an issuer identifier, wherein the second notification message is generated using a first communication protocol;

determine second communication protocol compatible with an issuer computing device associated with the issuer identifier;

match the first communication protocol to the second communication protocol;

convert the first communication protocol into the second communication protocol when the first communication protocol does not match the second communication protocol;

transmit, over a payment network, the second notification message to the at least one issuer associated with the issuer computing device;

receive a response message from the at least one issuer including at least one accountholder instruction, wherein the at least one accountholder instruction includes a token enabling the accountholder to use the compromised account stored within the electronic wallet; and update the database based on the response message from the at least one issuer.

14. A non-transitory computer readable medium in accordance with claim 13, wherein the computer executable instructions further cause the CAM computing device to:

transmit the at least one accountholder instruction from the at least one issuer, to the user computing device; and display, on the user computing device, the at least one accountholder instruction, including one or more actionable steps instructing the accountholder on how to proceed after the account has been compromised.

15. A non-transitory computer readable medium in accordance with claim 13, wherein the computer executable instructions further cause the CAM computing device to:

receive at least one merchant identifier from the at least one issuer, wherein the at least one merchant identifier is associated with a merchant using the account for card-on-file transactions;

assemble a combined merchant list, including the at least one merchant identifier received from the at least one issuer; and transmit the combined merchant list to the user computing device.

16. A non-transitory computer readable medium in accordance with claim 13, wherein the computer executable instructions further cause the CAM computing device to:

receive, from the user computing device, a first set of incident data, wherein the first set of incident data comprises one or more of a time, a date, a location and a type of transaction card associated with the compromised account.

17. A non-transitory computer readable medium in accordance with claim 16, wherein the computer executable instructions further cause the CAM computing device to:

determine whether the first set of incident data matches a second, previous set of incident data;

identify a pattern of compromise within the first set of incident data; and generate a further action request for the issuer based on the identified pattern of compromise.

18. A method in accordance with claim 5, wherein the pattern of compromise comprises at least one of: a particular time of day that a number of payment transaction cards beyond a predetermined threshold are compromised, and a particular location, including a particular point-of-sale (POS), where a number of payment transaction cards beyond a predetermined threshold are compromised.

* * * * *